United States Patent [19]

Kumar

[11] Patent Number: 5,419,530

[45] Date of Patent: May 30, 1995

[54] MICROMETER-CONTROLLED LINEAR FLOW RATE FLUID FLOW VALVE ASSEMBLY

[75] Inventor: Viraraghavan S. Kumar, Palm Bay, Fla.

[73] Assignee: Teknocraft, Inc., Melbourne, Fla.

[21] Appl. No.: 197,165

[22] Filed: Feb. 16, 1994

[51] Int. Cl.⁶ .......................... F16K 1/02; F16K 1/50; F16K 1/52; F16K 31/50

[52] U.S. Cl. ...................................... 251/95; 251/104; 251/110; 251/205; 251/265; 251/285

[58] Field of Search ................. 251/95, 101, 102, 205, 251/264, 265, 267, 273, 274, 285

[56] References Cited

U.S. PATENT DOCUMENTS

| | | | |
|---|---|---|---|
| 633,217 | 9/1899 | Qurin | 251/265 |
| 1,007,338 | 10/1911 | Cochrane et al. | 251/265 |
| 1,523,953 | 1/1925 | Giesler | 251/265 |
| 3,098,637 | 7/1963 | Baustian | 251/285 |
| 3,409,271 | 11/1968 | Kallenbach | 251/265 |
| 3,428,291 | 2/1969 | Callahan, Jr. et al. | 251/265 |
| 4,483,512 | 11/1984 | Drapeau | 251/265 |

FOREIGN PATENT DOCUMENTS

| | | | |
|---|---|---|---|
| 430150 | 2/1948 | Italy | 251/285 |
| 133509 | 10/1919 | United Kingdom | 251/285 |

*Primary Examiner*—George L. Walton
*Attorney, Agent, or Firm*—Charles E. Wands

[57] ABSTRACT

A micro-valve assembly for providing precise regulation of fluid flow between an input port and an output port comprises a valve body configured to installed with the valve assembly and forming therewith a fluid flow chamber between the fluid flow rate control port and the output port, the valve body having an internally threaded cylindrical portion. A rotatable valve adjustment member has an externally threaded cylindrical portion sized to engage the internally threaded cylindrical portion of the valve body. The externally threaded cylindrical portion of the rotatable valve adjustment member has an internally threaded axial bore. The internally threaded bore of the rotatable valve adjustment member has a longitudinal axis and a pitch finer than that of the externally threaded cylindrical portion thereof. A valve stem has an externally threaded shaft portion, sized to engage and being threaded into the internally threaded axial bore of the cylindrical portion of the rotatable valve adjustment member, and a poppet member disposed at one end of the externally threaded shaft. The poppet member is sized to close the fluid flow rate control port of the valve assembly when brought into engagement with the seat. The valve stem is axially translatable within the internally threaded axial bore of the cylindrical portion of the rotatable valve adjustment member by the rotation of the rotatable valve adjustment member about the longitudinal axis, thereby controlling the position of the poppet member relative to the seat of the fluid rate control port.

17 Claims, 5 Drawing Sheets

MICROMETER-CONTROLLED LINEAR FLOW RATE FLUID FLOW VALVE ASSEMBLY

FIELD OF THE INVENTION

The present invention relates in general to fluid control devices and is particularly directed to a new and improved micro-valve assembly configuration that provides precision control of linear fluid flow between the valve assembly's input and output ports over a relatively narrow range of valve displacement.

BACKGROUND OF THE INVENTION

The fundamental functionality of a fluid flow control valve is the regulation of the flow of fluid between its input and output ports. In micro-fluid flow control systems requiring precise regulation of the rate of fluid flow in extremely reduced volume fluid flow applications, the micro-valve assemblies that have been customarily employed are of two basic types. The first, diagrammatically illustrated in FIG. 1, employs a needle valve 1, having a conically tapered nose portion 2, which is controllably translated through a relatively long stroke along the axis 3 of a fluid bore 4. Because of the length of the stroke and the gradual taper of the needle valve, it is possible to very precisely adjust the effective area of an annular region defined between the surface of the conically tapered nose of the needle valve and the fluid bore, and thereby provide precise control of the fluid flow rate between and input port 5 and an exit port 6, which are in fluid communication with opposite ends of the bore 4. Now, although such a needle valve assembly allows the fluid flow rate to be very finely adjusted, the flow rate is non-linear over the range of displacement of the valve, as shown by fluid flow rate curve II in FIG. 2.

A second type of micro-valve assembly, diagrammatically illustrated in FIG. 3, employs a poppet 7 that is translated over a very short stroke along an axis 8 relative to a valve seat 9, which surrounds a fluid bore 10 the rate of flow through which is to be controlled. Advantageously, as shown at curve IV in FIG. 4, the poppet type of micro-valve assembly of FIG. 3 is capable of providing a very linear fluid flow rate over a prescribed range of separation $D_{79}$ of the poppet 7 from the valve seat 9. Unfortunately, because the range of translation or stroke of the poppet relative to the valve seat that provides the linear fluid flow rate is extremely small (e.g. on the order of twenty-five thousandths of an inch), adjusting and setting the fluid flow rate is a very difficult and imprecise task. Indeed, the short stroke encountered in a conventional mechanical translation mechanism, which conventionally involves directly rotating a threaded valve stem to which the poppet is attached (as by way of a cap or sleeve solid with the valve stem), does not provide for a smooth and fine adjustment of the translation of the poppet 7 relative to the valve seat within such a narrow range of opening.

SUMMARY OF THE INVENTION

In accordance with the present invention, the drawbacks of conventional micro-valve assemblies described above are effectively remedied by a new and improved poppet type valve assembly configuration that is capable of being mechanically translated (adjusted by hand) to a precise degree of valve opening, and thereby provide precise control of linear fluid flow rate between the valve's input and output ports over a very narrow range of valve displacement.

For this purpose, rather than directly adjust the displacement of the poppet valve stem, as in the prior art, the present invention employs a differentially threaded linear translation arrangement that provides vernier control of the location of the poppet relative to the valve seat, so that the valve opening position and thereby the fluid flow rate can be very tightly regulated by hand-manipulation of a poppet displacement mechanism.

More particularly, the micro-valve assembly in accordance with the present invention is comprised of a generally cylindrical base member having a longitudinal axis that may be generally co-linear with a fluid input port and a fluid output port. The fluid input port opens into a first interior chamber, the volume of which is defined by cylindrical sidewalls that extend into the base member from the input port and a first side of an interior endwall member. The endwall member is solid with an outer body wall portion of the valve base member and extends transversely of the first interior chamber to a termination valve seat surface of a generally cylindrical valve seat. On the opposite side of the endwall member, the valve's output port opens into a second interior chamber, which is bounded by cylindrical sidewalls that extend into the base member from the output port and the opposite side of the interior endwall member.

The valve assembly further includes a generally cylindrically symmetrical fluid flow rate control subassembly, which is configured to be installed into the valve base member. The fluid flow rate control subassembly includes a body member, a first end of which has an interior surface geometry that forms a fluid flow chamber between the input port and the output port of the base member. The first end of the body member has an externally threaded cylindrical portion that is sized to be threaded into an internally threaded, generally cylindrical portion of the base member, the generally cylindrical portion of the base member being solid with and extending outwardly from the outer body wall portion of the valve base member.

The externally threaded cylindrical portion of the body member extends from a cylindrical outer ring portion thereof, with the cylindrical outer ring portion having a first generally flat surface thereof that becomes seated against a generally flat surface of the internally threaded cylindrical base member portion of the valve base member, when the body member is threaded into the valve base member. In order to provide a fluid-tight seal between the body member and the base member, an O-ring is captured between the externally threaded cylindrical portion and the internally threaded, generally cylindrical portion of the base member.

The body member further includes a generally cylindrical interior wall portion, which extends from a second end of the body member to an interior end portion thereof, that is spaced apart from the externally threaded cylindrical portion of the first end of the body member. The generally cylindrical interior wall portion of the body member is joined to an outer wall portion thereof by means of an interior wall region that extends transversely between and is solid with each of the interior wall portion and the outer wall portion of the body member.

The generally cylindrical interior wall portion of the body member has an interior bore that is coaxial with the longitudinal axis of the body member and is partially threaded from a second end of the body member to an interior bore region thereof that is spaced apart from the interior end portion thereof by a non-threaded cylindrical bore portion. The cylindrical bore portion terminates at a keyed bore region that extends to the interior end portion of the valve body member. The keyed bore region may have a polygonal (e.g. generally hexagonal) shape of a diameter larger than that of the interior bore region. The hexagonal shape of the keyed bore region is configured to match that of a poppet shaft (or valve stem), that passes into the interior bore of the body member and serves to prevent rotation of the poppet shaft once the corresponding keyed surface of the poppet shaft enters the keyed bore region, so that rotation of a dual threaded tubular portion of a rotatable valve adjustment member will cause the valve stem to be translated longitudinally along the axis of the valve body, and thereby control the degree of separation of the poppet relative to the cylindrical valve seat. The depth of the keyed bore region defines the range of longitudinal translation (degree of opening) of the valve poppet relative to the cylindrical valve seat.

The partially threaded interior bore of the generally cylindrical interior wall portion of the body member receives a rotatable valve adjustment member. The rotatable valve adjustment member has an outer, generally cylindrical sleeve portion, the interior diameter of which is larger than the outer diameter of the outer wall portion of the body member, so as to allow the outer wall portion of the body member to fit within the sleeve portion. The sleeve portion of the valve adjustment member terminates at a cap portion, which may be marked around its periphery with a fluid flow rate scale, that associates rotational position of the sleeve with fluid flow rate through the valve assembly. In order to frictionally fix the rotational position of the sleeve portion relative to the valve body member, an O-ring may be provided between the interior wall surface of the sleeve portion and the exterior wall surface of outer wall portion of the valve body member.

Extending internally from the cap portion of the valve adjustment member is a dual threaded tubular portion having an outer cylindrical surface and an interior bore. The outer cylindrical surface of the tubular portion is threaded, with the outer threads being sized to engage the internally threaded cylindrical portion of the valve body. The interior bore of the tubular portion is also threaded, with the inner threads having a pitch finer than that of the outer threads. The differential pitch between the (relatively coarse pitch) outer threads and the (relatively fine pitch) inner threads of the dual threaded tubular portion of the valve adjustment member allows for precise vernier control of displacement of a valve poppet along its translational axis, thereby achieving precise control of flow rate over a range of linear flow rate between the input and output ports. In particular, the relatively coarse pitch of the outer threads and the relatively fine pitch of the inner threads of the tubular portion of the valve adjustment member results in a pitch differential between the inner and outer threads that allows a large rotation of the sleeve to execute a very small axial translation of the poppet valve.

Extending into the lower interior end of the bore of the valve body member and being threaded into the interior bore of the tubular portion of the rotatable valve adjustment member is an externally threaded poppet valve stem. The external threads of the valve stem are sized to engage the inner threads of the interior bore of the tubular portion of the rotatable valve adjustment member, and a poppet is disposed at the lower end of the externally threaded valve stem. The poppet has a flat circular bottom surface which is sized to fit flush against the entirety of the perimeter of the valve seat when the sleeve portion of the valve adjustment member is rotated, thereby causing axial translation of the valve stem along its longitudinal axis and thus controlling the position of the poppet relative to the valve seat.

As noted earlier, the cylindrical bore portion of the interior bore of the valve body member terminates at a keyed (hexagonal) bore region that extends to its interior end portion. The corresponding hexagonal surface portion of the poppet that matches the hexagonally keyed bore region serves to prevent rotation of the valve stem, when the hexagonal surface portion enters the hexagonally keyed bore region. Disposed between the hexagonal surface portion and the external threads of the valve stem is an unthreaded shaft portion having a detent sized to receive an O-ring that provides a fluid-tight seal between the valve stem and the interior bore, thereby providing a seal for the fluid flow chamber.

As an optional element, the valve assembly of the present invention may include a controllable locking member, such as a screw element which passes through a bore in the cap portion and is threaded to engage an interior threaded bore within the valve stem, thereby controllably locking the valve stem and the rotatable valve adjustment member in a fixed position.

The micro-valve assembly of the present invention is put together by first screwing the tubular portion of the rotatable valve adjustment member into the threaded bore of the valve body. Then, the valve stem is inserted through the lower end of the valve body and screwed into the threaded interior bore of the tubular portion of the rotatable valve adjustment member, so that the hexagonal surface portion of the valve stem enters into the keyed (hexagonal) portion of the lower interior end of the valve body. The valve adjustment member is backed out (via a counter clockwise rotation) to ensure engagement of the keying surfaces. The externally threaded cylindrical portion of the body member (with its O-ring in place) is then screwed into the internally threaded cylindrical base member portion of the valve base member, so that the flat surface of the cylindrical outer ring portion becomes seated against the flat surface of the valve base member.

The sleeve portion of the rotatable valve adjustment member is then rotated (clockwise) to cause the valve stem to be translated and the valve poppet to be brought into abutting contact with the poppet valve seat, thereby closing the valve. Fluid flow rate indicia on the cap portion of the valve adjustment member may then be calibrated relative to the fully closed position. Thereafter, counter-clockwise rotation of the sleeve member will cause a very gradual translation of the valve poppet away from the valve seat, so that precise control of linear fluid flow rate over the very narrow range of poppet displacement may be realized.

DETAILED DESCRIPTION

Figure 5:
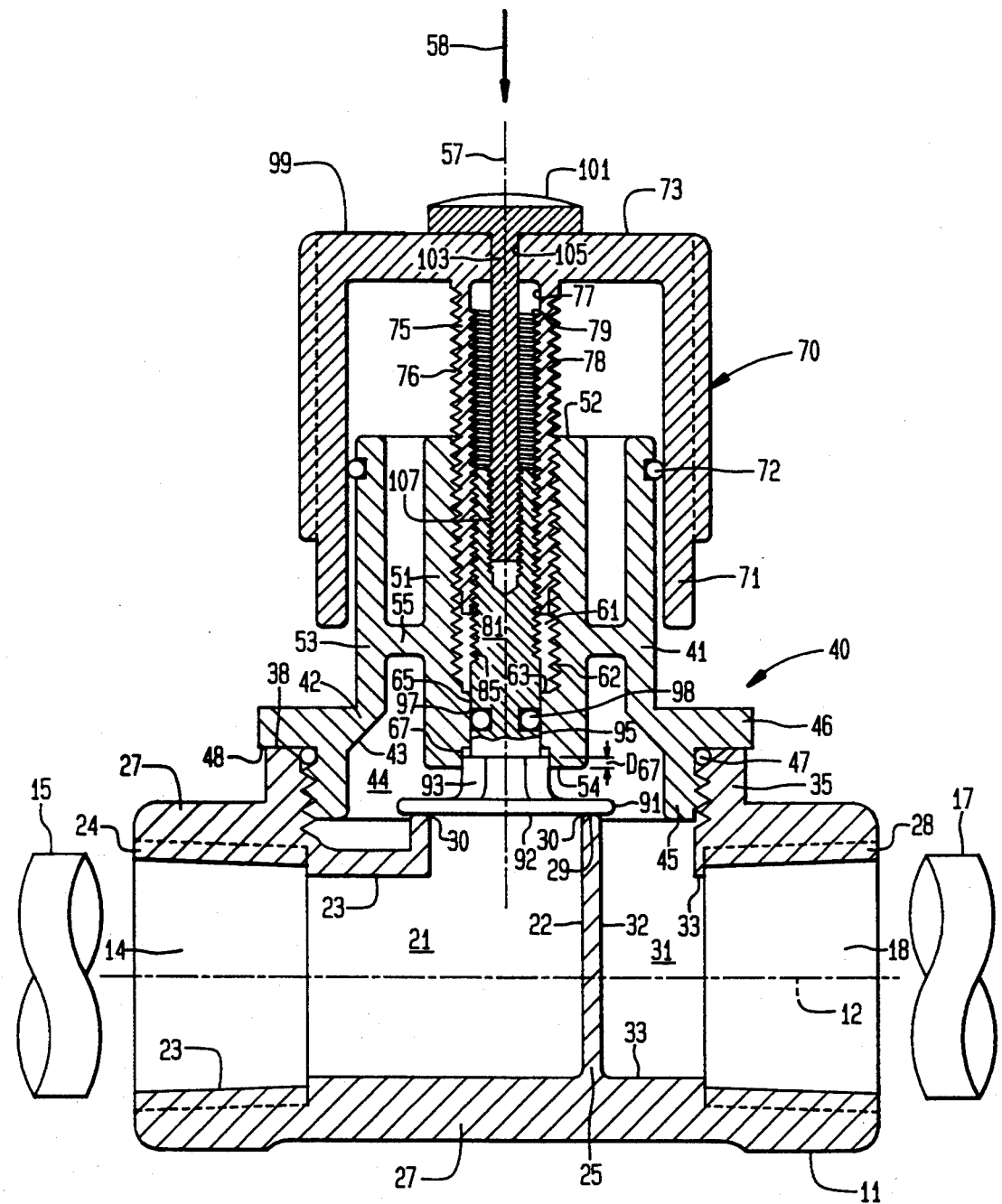
FIG. 5 is a diagrammatic side sectional view of the overall valve assembly of the present invention.

The present invention will now be described with reference to FIG. 5, which is a diagrammatic side sectional view of the overall valve assembly, and FIGS. 6-11, which illustrate individual components of which the valve assembly of FIG. 5 is configured. More particularly, the valve assembly of the present invention is comprised of a generally cylindrical base member 11 having a longitudinal axis 12 that is co-linear with an input port 14 through which fluid is introduced to the valve assembly, and an output port 18 from which fluid, the flow rate of which is to be regulated, exits the valve assembly. Input port 14 and output port 18 may be internally threaded, as shown at 24 and 28, so that the valve assembly may be installed between respective sections 15 and 17 of fluid transporting conduit, the flow rate through which is to be regulated.

Within base member 11, input port 14 opens into a first interior chamber 21, which is bounded by cylindrical sidewalls 23 and a first side 22 of an interior endwall member 25. Endwall 25 is solid with an outer body wall portion 27 of the valve base member, and extends transversely of longitudinal axis 12 to a termination valve seat surface 29 of a generally cylindrical valve seat 30. Similarly, output port 18 opens into a second interior chamber 31, which is bounded by cylindrical sidewalls 33 and a second side 32 of interior endwall 25.

Figure 1:
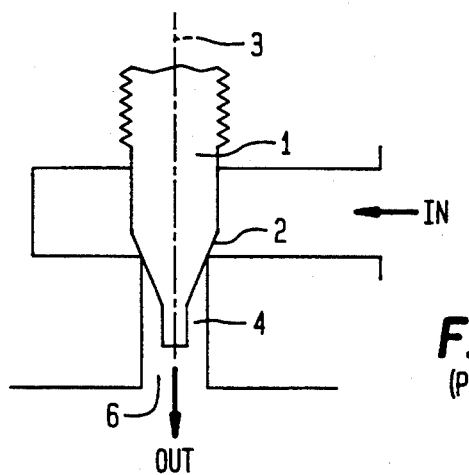
FIG. 1 diagrammatically illustrates a conventional needle valve.
Figure 2:
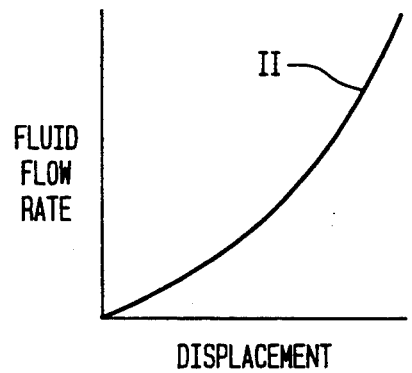
FIG. 2 shows the non-linear flow rate characteristic associated with a needle valve of the type shown in FIG. 1.
Figure 3:
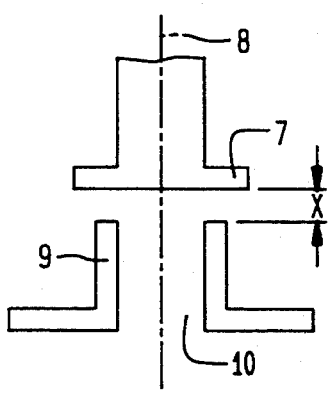
FIG. 3 diagrammatically illustrates a conventional poppet valve.
Figure 4:
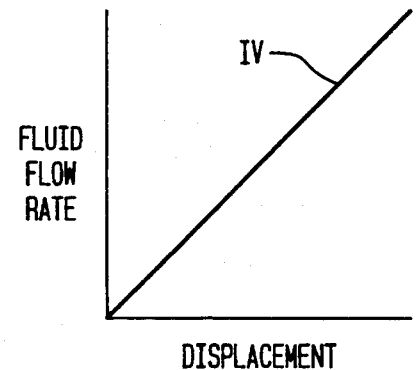
FIG. 4 shows the linear flow rate characteristic associated with a poppet valve of the type shown in FIG. 3.
Figure 6:
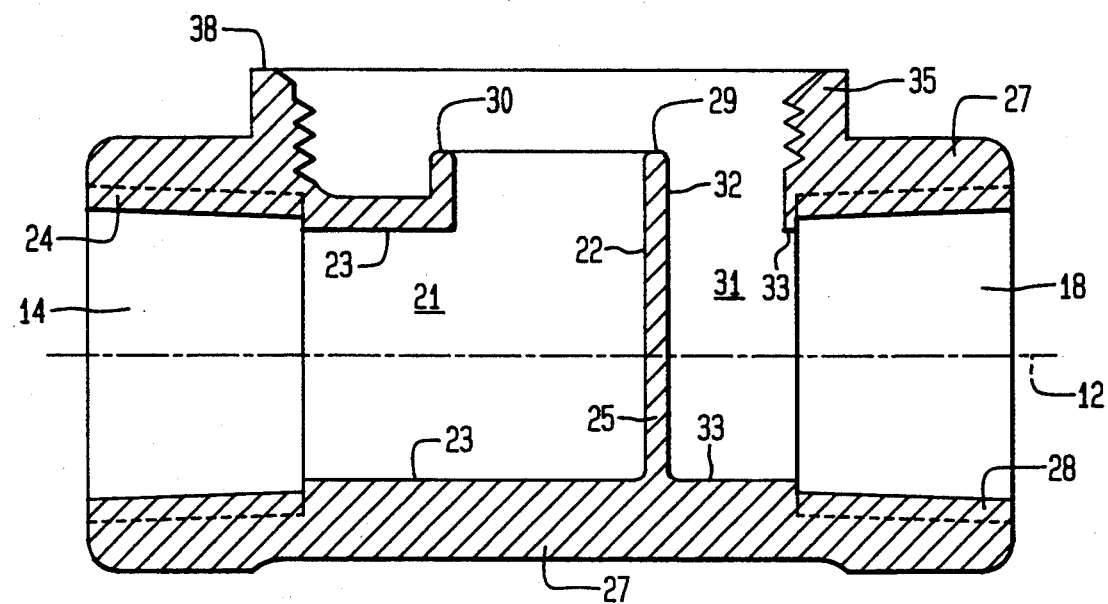
FIG. 6 is a diagrammatic side sectional view of the base member of the valve assembly of FIG. 1.
Figure 7:
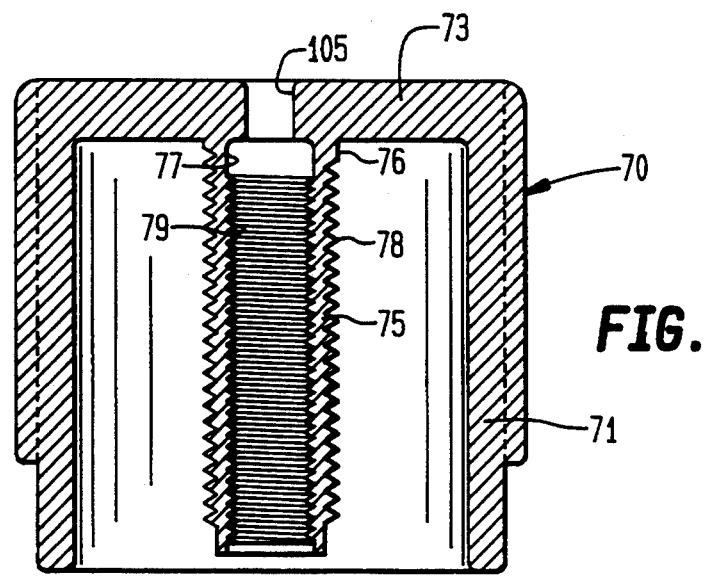
FIG. 7 is a diagrammatic side sectional view of the rotatable valve adjustment member of the valve assembly of FIG. 1.
Figure 8:
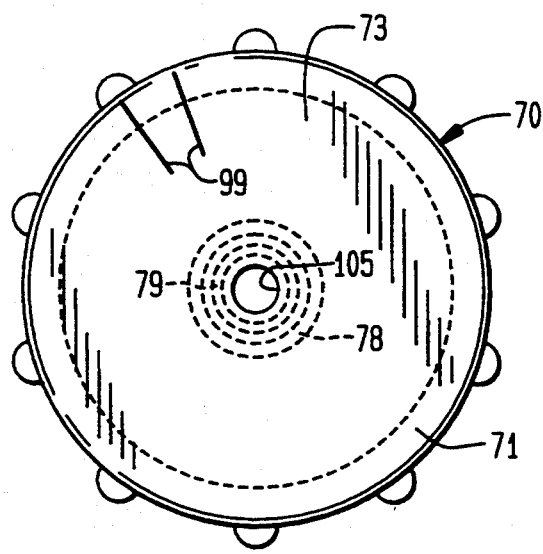
FIG. 8 is a diagrammatic top view of FIG. 7.
Figure 9:
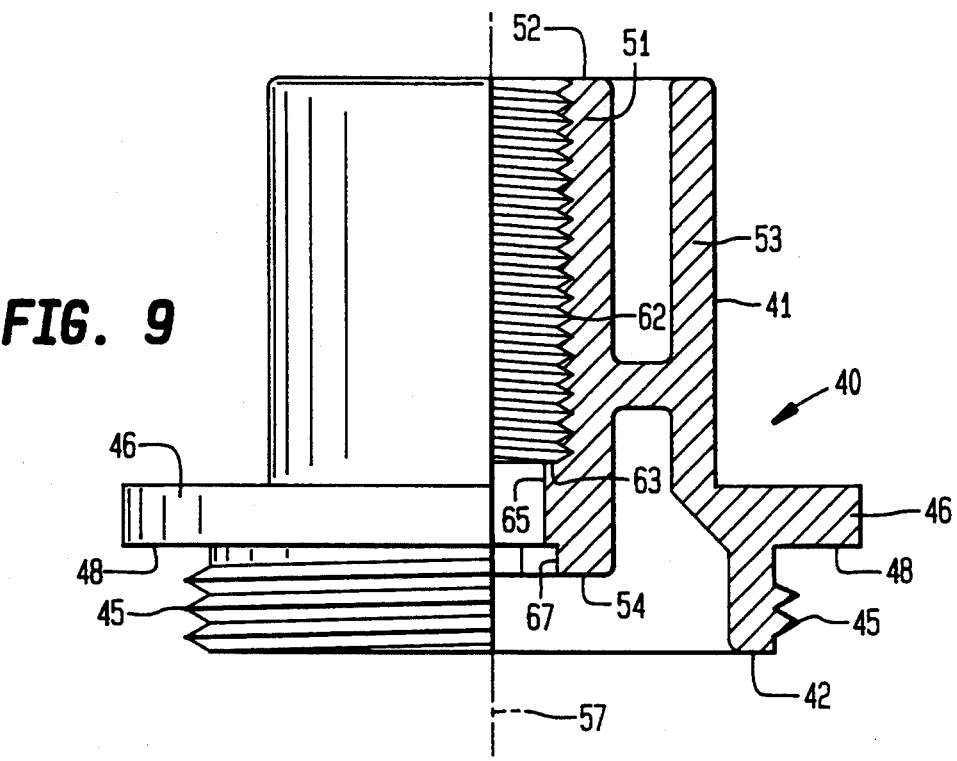
FIG. 9 is a diagrammatic side sectional view of the body member of the fluid flow rate sub-assembly employed in the valve assembly of FIG. 1.
Figure 10:
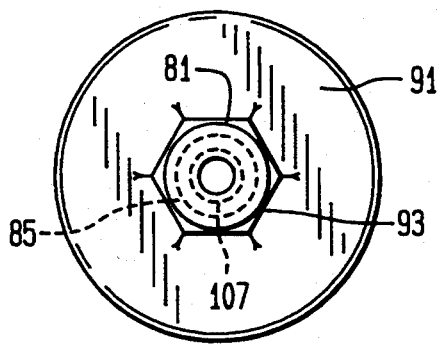
FIG. 10 is a diagrammatic top view of the valve stem of the fluid flow rate sub-assembly employed in the valve assembly of FIG. 1.
Figure 11:
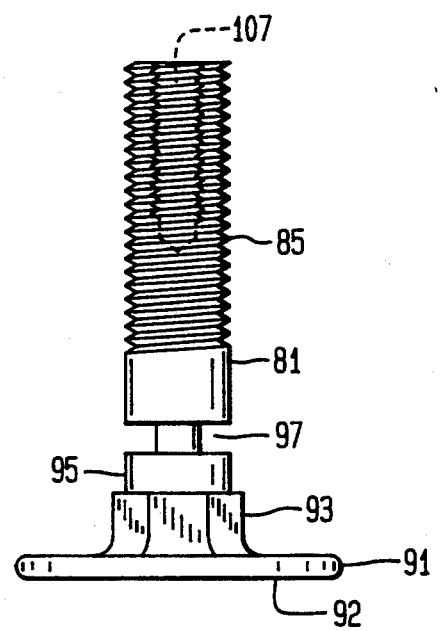
FIG. 11 is a diagrammatic side view of the valve stem of FIG. 10.

Because valve seat 30 is generally cylindrical, its associated termination valve seat surface 29, which engages a valve poppet 91, is generally annular or ring-shaped. As can be seen in FIGS. 5 and 6, the contact surface area between the flat circular bottom surface 92 of valve poppet 91 and ring-shaped valve seat surface 29 of generally cylindrical valve seat 30 is considerably less than the circular cross-sectional area of aperture opening or fluid bore 30A that is defined by the generally cylindrical valve seat 30. Because the surface contour of the termination valve seat surface 29 is convexly rounded, the thickness of the ring-shaped contact area is very narrow, forming a thin or fine contact edge between the flat bottom surface 92 of the poppet 91 and the valve seat 30. Namely, along a radial line that extends from axis 57 across the bottom flat surface 92 of the poppet 91 to the generally ring-shaped termination valve seat surface 29, the extent of contact between the valve seat surface 29 and the bottom surface 92 of the poppet 91 is less than the thickness of the cylindrical wall of the valve seat proper. As a result, as described above with reference to FIG. 3, such a poppet-type valve assembly, where the stroke is very short, provides a very linear fluid flow rate over the limited range of translation or stroke of the poppet 91 relative to the valve seat 30. As will be described below, the depth $D_{67}$ of a keyed bore region 67 of member 41 defines the range of longitudinal translation (degree of opening) of the valve poppet 91 relative to the cylindrical valve seat 30.

The valve assembly further includes a fluid flow rate control sub-assembly 40, which is generally cylindrically symmetrical about an axis 57 and is configured to be installed with the valve base member 11. Fluid flow rate control sub-assembly 40 includes a body member 41, a first end 42 of which has an interior surface geometry 43, that forms a fluid flow chamber 44 through which fluid, the flow rate of which is to be controlled, flows between the input port 12 and the output port 14 of valve base member 11.

For this purpose, the first end 42 of body member 41 has an externally threaded cylindrical portion 45, that is sized to be threaded into an internally threaded, generally cylindrical portion 35 of base member 11, that is solid with and extends outwardly from outer body wall portion 27 of the valve base member 11. Externally threaded cylindrical portion 45 of body member 41 extends from a cylindrical outer ring portion 46 of the body member 41, with outer ring portion 46 having a first generally flat surface 48 thereof that becomes seated against a generally flat surface 38 of internally threaded cylindrical base member portion 35 of valve base member 11, when body member 41 is threaded into valve base member 11. To provide a fluid-tight seal between body member 41 and base member 11, an O-ring 47 may be captured between the externally threaded cylindrical portion 45 and the internally threaded, generally cylindrical portion 35 of base member 11, as shown in FIG. 5.

Body member 41 further includes a generally cylindrical interior wall portion 51, which extends from a second end 52 of body member 41 to an interior end portion 54, that is spaced apart from the externally threaded cylindrical portion 45 of the first end 42 of the body member 41. The generally cylindrical interior wall portion 51 of body member 41 is joined to a generally cylindrical outer wall portion 53 of body member 41 by means of an interior wall region 55, that extends between and is solid with each of interior wall portion 51 and outer wall portion 53 of the body member 41. Interior wall region 55 is generally transverse to the direction of longitudinal axis 57 of body member 41.

The generally cylindrical interior wall portion 51 of body member 41 has an interior bore 61 that is coaxial with longitudinal axis 57 and is partially threaded, as shown at 62, from second end 52 of body member 41 to an interior bore region 63 thereof that is spaced apart from end 54 by a non-threaded cylindrical bore portion 65. Cylindrical bore portion 65 terminates at a keyed bore region 67 that extends to the interior end portion 54 of the valve body member 41. Keyed bore region 67 may have a polygonal (e.g. generally hexagonal) shape, of a diameter larger than that of interior bore region 63. The hexagonal shape of keyed bore region 67 is configured to match that of a poppet shaft (or valve stem), to be described, that passes into the interior bore 61 of body member 41, and serves to prevent rotation of the poppet shaft once the corresponding keyed surface of the poppet shaft enters keyed bore region 67, so that rotation of a dual threaded tubular portion of a rotatable valve adjustment member, to be described, will cause the valve stem to be translated longitudinally along axis 57, and thereby control the degree of separation of the poppet relative to cylindrical valve seat 30. The depth $D_{67}$ of keyed bore region 67 defines the range of longitudinal translation (degree of opening) of the valve poppet relative to cylindrical valve seat 30.

The partially threaded interior bore 61 of the generally cylindrical interior wall portion 51 of body member 41 receives a threaded rotatable valve adjustment member 70. Rotatable valve adjustment member 70 has an outer generally cylindrical sleeve portion 71, the interior diameter of which is larger than the outer diameter of outer wall portion 53 of the body member 41, so as to allow the outer wall portion 53 of the body member 41 to fit within sleeve portion 71. In order to frictionally fix the rotational position of the sleeve portion 71 relative to the valve body member 41, an O-ring 72 may be provided between the interior wall surface of the sleeve portion 71 and the exterior wall surface of outer wall portion 53 of the valve body member 41. Sleeve portion 71 of valve adjustment member 70 terminates at top or cap portion 73 thereof.

Extending internally from the cap portion 73 of the valve adjustment member 70 is a dual threaded tubular portion 75, having a threaded outer cylindrical surface 76 and a threaded interior bore 77. Outer cylindrical surface 76 of tubular portion 75 is threaded, as shown at 78, the outer threads 78 being sized to engage the internally threaded cylindrical portion 62 of the valve body 41. The interior bore 76 of tubular portion 75 is also threaded, as shown at 79, the inner threads 79 having a pitch that is finer than that of outer threads 78. As mentioned previously, this differential pitch between the outer threads 78 and inner threads 79 that allows for precise vernier control of displacement of a valve poppet along axis 57, thereby achieving precise control of flow rate over a range of linear flow rate between the input and output ports.

Extending into the lower end 54 of bore 61 of valve body member 41 is a poppet valve stem 81, which is externally threaded as shown at 85. The external threads 85 of valve stem 81 are sized to engage the inner threads 79 of the interior bore 76 of tubular portion 75 of the rotatable valve adjustment member 70. A poppet 91 disposed at the lower end 92 of the externally threaded valve stem 81. Poppet 91 has a flat circular bottom surface 92, which is sized to fit flush against the entirety of the perimeter of valve seat 30, when the sleeve portion 71 of valve adjustment member 70 is rotated clockwise about axis 75 when viewed in the direction of arrow 58, thereby causing (downward, as viewed in FIG. 5) axial translation of valve stem 81 along axis 57 and thus controlling the position of the poppet 91 relative to the valve seat 30.

As pointed out previously, the cylindrical bore portion 65 of interior bore 61 of valve body member 41 terminates at a keyed (e.g. hexagonal) bore region 67 that extends to its interior end portion 54. The lower end 92 of poppet 91 has a corresponding hexagonal surface portion 93 that matches the hexagonally keyed bore region 67, and thereby serves to prevent rotation of the valve stem 81 when the hexagonal surface portion 93 enters the hexagonally keyed bore region 67. Disposed between hexagonal surface portion 93 and the external threads 85 of valve stem 81 is an unthreaded shaft portion 95 having a detent 97 that is sized to receive an O-ring 98 that provides a fluid-tight seal between the valve stem 81 and interior bore 61, thereby providing a seal for fluid flow chamber 44. The cap portion 73 of the valve adjustment member may be marked around its periphery with a fluid flow rate scale, shown generally at 99, that associates rotational position of the sleeve with fluid flow rate through the valve assembly.

As an optional element, in lieu of O-ring 72, the valve assembly of the present invention may include a controllable locking member 101, such as a screw element 103, which passes through a bore 105 in the cap portion 73, and is threaded to engage an interior threaded bore 107 within valve stem 81, thereby controllably locking the valve stem 81 and the rotatable valve adjustment member 70 in a fixed position.

The micro-valve assembly of the present invention is put together by first screwing the tubular portion 75 of the rotatable valve adjustment member 70 into the threaded internal bore 61 of the valve body 41. Then, the valve stem 81 is inserted through the lower end 54 of the valve body 41 and screwed into the threaded interior bore 79 of the tubular portion of the rotatable valve adjustment member, so that the hexagonal surface portion 93 of the valve stem enters into the keyed (hexagonal) portion 67 of the lower interior end of the valve body. The externally threaded cylindrical portion 45 of the valve body 41 (with its 0-ring 47 in place) is then screwed into the internally threaded generally cylindrical portion 35 of the valve base member 11, so that the flat surface 48 of the cylindrical outer ring portion 46 becomes seated against the flat surface 38 of the valve base member 11.

The sleeve portion 71 of the rotatable valve adjustment member 70 is then rotated (clockwise about axis 57 as viewed along arrow 58), so as to cause the valve stem 81 to be translated (downwardly, as seen in FIG. 5) and the valve poppet 91 to be brought into abutting contact with the poppet valve seat 30, thereby closing the valve. Fluid flow rate indicia on the cap portion 73 of the valve adjustment member 70 may then be calibrated relative to the fully closed position. Thereafter, counter-clockwise rotation of the sleeve member 71 will cause a very gradual translation of the valve poppet 91 away from the valve seat 30, so that precise control of linear fluid flow rate over the very narrow range of poppet displacement may be realized.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A valve assembly for regulating fluid flow therethrough in linear proportion to displacement, comprising:

a valve base member having a fluid input port into which fluid is introduced, a fluid output port from which fluid, the flow rate of which is to be proportionally regulated, exits said valve assembly, and a generally circular fluid flow rate control port formed of a generally cylindrical valve seat surrounding a circular fluid flow aperture, disposed between said input port and said output port, said generally cylindrical valve seat having a generally ring-shaped termination valve seat surface, which is arranged to be contacted by a flat surface of one end of a displaceable poppet element and thereby close said circular fluid flow aperture, said generally ring-shaped termination valve seat surface having a contact surface area with said poppet element that is less than the cross-sectional circular area of said circular fluid flow aperture, said poppet element having a key portion disposed at a portion spaced apart from said one end thereof;

a valve body configured to be installed with said valve base member and forming therewith a fluid flow chamber between said fluid flow rate control port and said output port, said valve body having an internally threaded cylindrical portion extending along a major portion thereof and a keyed opening along a minor portion thereof;

a rotatable valve adjustment member having an externally threaded cylindrical portion sized to engage the internally threaded cylindrical portion of said valve body, said externally threaded cylindrical portion of said rotatable valve adjustment member having an internally threaded axial bore extending along a major portion thereof, the internally threaded bore of said rotatable valve adjustment member having a longitudinal axis and a thread pitch different than that of the externally threaded cylindrical portion thereof; and a valve stem having an externally threaded shaft portion, sized to engage and being threaded into the internally threaded axial bore of said cylindrical portion of said rotatable valve adjustment member, and wherein said popper element is disposed at one end of said externally threaded shaft, said valve stem being axially translatable within the internally threaded axial bore of said cylindrical portion of said rotatable valve adjustment member as said key portion of said poppet element moves within said keyed opening of said valve body by the rotation of said rotatable valve adjustment member about said longitudinal axis, thereby controlling the position of said flat surface poppet element relative to said generally cylindrical valve seat as defined by the range of movement of said key portion of said poppet with said keyed opening of said valve body and thereby provide a linearly proportional fluid flow rate through said generally circular fluid flow rate control port between said input port and said output port.

2. A valve assembly according to claim 1, wherein said flat surface poppet element has a generally flat bottom surface that engages said generally cylindrical valve seat, and wherein said generally ring-shaped termination valve seat surface of said generally cylindrical valve seat is generally convex, so that along a radial line extending across said generally flat bottom surface of said poppet element from an axis of said generally circular fluid flow aperture to said generally ring-shaped termination valve seat surface, the extent of contact between said valve seat surface and said bottom surface of said poppet element is less than the thickness of a cylindrical wall of said generally cylindrical valve seat surrounding said circular fluid flow aperture.

3. A valve assembly according to claim 1, wherein the internally threaded bore of said rotatable valve adjustment member has a thread pitch finer than that of the externally threaded cylindrical portion thereof.

4. A valve assembly according to claim 1, further including a controllable locking member which is operative to controllably lock said valve stem and said rotatable valve adjustment member into a fixed mutual relationship.

5. A valve assembly according to claim 1, wherein each of said key portion of said poppet and said keyed opening of said valve body has a polygonal surface.

6. A valve assembly according to claim 5, further including a locking screw engaging said rotatable valve adjustment member and being threaded into said valve stem so as to lock said valve stem into solid engagement with said valve adjustment member.

7. A valve assembly according to claim 1, wherein said valve base member comprises a generally cylindrical base member having a longitudinal axis that is generally co-linear with said fluid input port and said fluid output port, and wherein said fluid input port opens into a first interior chamber, the volume of which is defined by cylindrical sidewalls that extend into the base member from the input port and a first side of an interior endwall member, said endwall member being solid with an outer body wall portion of said valve base member and extending generally transversely of said first interior chamber to said valve seat, and wherein, on a second side of said endwall member, said fluid output port opens into a second interior chamber, which is bounded by cylindrical sidewalls that extend into said base member from said fluid output port and said second side of said interior endwall member.

8. A valve assembly according to claim 7, wherein said valve body is configured to be installed into said valve base member, a first end of said valve body having an interior surface geometry that forms a fluid flow chamber between said fluid input port and said fluid output port, and wherein said first end of said valve body has an externally threaded cylindrical portion that is sized to be threaded into an internally threaded, generally cylindrical portion of said valve base member, the generally cylindrical portion of said valve base member being solid with the outer body wall portion of said valve base member.

9. A valve assembly according to claim 8, wherein said externally threaded cylindrical portion of said valve body extends from a cylindrical outer ring portion thereof, with the cylindrical outer ring portion having a first generally flat surface thereof that becomes seated against a generally flat surface of the internally threaded cylindrical base member portion of the valve base member, when said valve body is threaded into said valve base member.

10. A valve assembly according to claim 9, wherein an O-ring is captured between the externally threaded cylindrical portion and said internally threaded, generally cylindrical portion of said valve base member, so as to provide a fluid-tight seal between said valve body and said valve base member.

11. A valve assembly according to claim 7, wherein said valve body further includes a generally cylindrical interior wall portion, which extends from a second end of said valve body to an interior end portion thereof, that is spaced apart from the externally threaded cylindrical portion of said first end of said valve body.

12. A valve assembly according to claim 11, wherein said generally cylindrical interior wall portion of said valve body is joined to an outer wall portion thereof by an interior wall region that extends between and is solid with each of said interior wall portion and said outer wall portion of said valve body.

13. A valve assembly according to claim 11, wherein said generally cylindrical interior wall portion of said valve the body member has an interior bore that is coaxial with the longitudinal axis of said valve body and is partially threaded from a second end of said valve body to an interior bore region thereof that is spaced apart from the interior end portion thereof by a non-threaded cylindrical bore portion.

14. A valve assembly according to claim 13, wherein said non-threaded cylindrical bore portion terminates at said keyed opening of said valve body.

15. A valve assembly according to claim 14, wherein said keyed opening of said valve body has a polygonal shape of a diameter larger than that of said interior bore region, said polygonal shape of said keyed opening being configured to match that of said key portion of said poppet element of said valve stem that passes into the interior bore of said valve body and serves to prevent rotation of the poppet shaft once the corresponding keyed surface of said valve stem enters said keyed opening, so that rotation of said rotatable valve adjustment member will cause said valve stem to be translated longitudinally along the axis of said valve body, and thereby control the degree of separation of said poppet element relative to said valve seat.

16. A valve assembly according to claim 15, wherein said rotatable valve adjustment member has an outer, generally cylindrical sleeve portion, the interior diameter of which is larger than the outer diameter of the outer wall portion of said valve body, so as to allow the outer wall portion of said valve body to fit within said sleeve portion, said sleeve portion of said valve adjustment member terminating at a cap portion.

17. A valve assembly according to claim 16, wherein said valve adjustment member includes a dual threaded tubular portion extending from said cap portion, said dual threaded tubular portion having an outer cylindrical surface and an interior bore, said outer cylindrical surface of the tubular portion containing outer threads which are sized to engage the internally threaded cylindrical portion of said valve body, and wherein the interior bore of said tubular portion contains inner threads which have a pitch finer than that of said outer threads, whereby the differential pitch between said outer threads and said inner allows for precise vernier control of displacement of said poppet along its translational axis.

* * * * *